United States Patent
Bernhardi et al.

(10) Patent No.: US 6,289,215 B1
(45) Date of Patent: Sep. 11, 2001

(54) METHOD FOR OPERATING A TELECOMMUNICATION NETWORK USING MAINTENANCE MESSAGES HAVING FILTER CONDITIONS

(75) Inventors: Karl Bernhardi; Bernhard Schild, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/688,920

(22) Filed: Oct. 16, 2000

Related U.S. Application Data

(63) Continuation of application No. PCT/EP99/02778, filed on Apr. 12, 1999.

(30) Foreign Application Priority Data

Apr. 15, 1998 (EP) ................................................ 98 106 835

(51) Int. Cl.[7] ...................................................... H04Q 7/20
(52) U.S. Cl. ........................... 455/423; 455/449; 455/550
(58) Field of Search ................................... 455/423, 424, 455/550, 412, 449; 370/338, 349, 395, 422

(56) References Cited

U.S. PATENT DOCUMENTS

| | | | |
|---|---|---|---|
| 5,726,984 | * 3/1998 | Kobler et al. | 370/349 |
| 5,790,536 | * 8/1998 | Mahany et al. | 370/338 |
| 5,799,153 | * 8/1998 | Blau et al. | 395/200.53 |
| 5,854,789 | * 12/1998 | Lesch et al. | 370/395 |
| 6,163,544 | * 12/2000 | Andersson et al. | 370/422 |

OTHER PUBLICATIONS

"A Software Architecture Supporting CMIP Management Information Bases of ATM Switches" (Tian), dated Nov. 14, 1995, vol. 3, XP 000633611, pp. 1862–1866, as mentioned on p. 3 of the specification.

"Data Communication Networks: Open Systems Interconnection (OSI); Management", International Telecommunication Union, X.170, Geneva 1991, pp. 39 pages, as mentioned on p. 3 of the specification.

* cited by examiner

Primary Examiner—Daniel Hunter
Assistant Examiner—Thuan T. Nguyen
(74) Attorney, Agent, or Firm—Herbert L. Lerner; Laurence A. Greenberg; Werner H. Stemer

(57) ABSTRACT

The method defines operating a telecommunication network. Application objects which are to be processed using the filter conditions in a maintenance message are selected in an exchange from a control computer. In the exchange, a central interface program uses the filter condition to select an application program in a preselection process. When the application program is executed, the application objects to be processed are then selected and processed.

15 Claims, 5 Drawing Sheets

F1 = AND {i1, i2}

METHOD FOR OPERATING A TELECOMMUNICATION NETWORK USING MAINTENANCE MESSAGES HAVING FILTER CONDITIONS

CROSS-REFERENCE TO RELATED APPLICATION

This is a continuation of copending International Application PCT/EP99/02778, filed Apr. 12, 1999, which designated the United States.

BACKGROUND OF THE INVENTION

1. Field of the Invention

The invention lies in the telecommunications field. More specifically, the invention pertains to a method of operating a telecommunication network, in which call-processing equipment is controlled by a switching processor at a network node of a telecommunication network. The switching processor stores, besides the operating system, typically several hundred application programs for processing application objects. The application objects have object data which are prescribed according to association with a particular object class. The switching processor is maintained from a control computer, using maintenance messages. The maintenance messages contain filter conditions for selecting particular application objects.

If the call-processing equipment is an exchange, then there is, among other things, an application program for administration of the subscribers connected to the exchange. The data for these subscribers are stored in subscriber objects. If the exchange is put into operation or if subscriber data is later changed in the exchange, then this is expediently done from a central control computer. Powerful methods for maintaining the telecommunication network are produced if so-called open systems are used, whose programming entails the observance of standards applicable on a worldwide basis. By way of example, standards of the ISO (International Standardization Organization) and of the ITU (International Telecommunication Union) with its body ITU-T relate to the design of such open systems. On the basis of these standards, a separate telecommunications management network will be used to maintain the switching processor. The interfaces between the control computer and the switching processor are standardized in protocols.

From the control computer, the application objects are regarded as models for particular devices and resources, e.g. for hard disks, processors, transmission lines or subscriber connections. In the exchange, the application programs need to ensure that the object data for the application objects also corresponds to the actual operating states of the devices and resources.

Maintenance messages are explained in the standard X.710 (1991) "Data Communication Networks: Open Systems Interconnection (OSI); Management—Common Management Information Service Definition for CCITT Applications". Thus, for example, there are CREATE and GET maintenance messages for creating and getting the data for an application object. According to section 6.4 of standard X.710, the application objects have a tree structure which defines the relationship between the various application objects. An application object can be selected directly without a filter condition by stipulating the object class and by stipulating an identification for the application object. On the basis of section 6.5 of standard X.710, however, indirect selection is also used, in which case levels are first defined in the tree structure, whose application objects are used for a filter operation which is to be carried out on that basis. The way to process the maintenance messages simply and as quickly as possible in the switching processor is not disclosed in standard X.710.

The document A SOFTWARE ARCHITECTURE SUPPORTING CMIP MANAGEMENT INFORMATION BASES OF ATM SWITCHES, GLOBECOM 1995. IEEE GLOBAL TELECOMMUNICATIONS CONFERENCE; SINGAPORE; Nov. 14–16, 1995, Vol. 3, Nov. 14, 1995 (1995-11-14), pages 1862–66, XP000633611 INSTITUTE OF ELECTRONIC ENGINEERS by Dan Tian discloses a software architecture which has a joint management and information protocol for a management information base of network switching elements having asynchronous transfer mode. An administration manager transmits an activity instruction to an administration agent for the network switching element. The administration agent transmits the results of the activity carried out and/or event reports to the administration manager.

SUMMARY OF THE INVENTION

The object of the invention is to provide a method of operating a telecommunications network which overcomes the above-noted deficiencies and disadvantages of the prior art devices and methods of this kind, and which is a simple method for operating a telecommunications network, in which the application objects are selected using maintenance messages having filter conditions.

With the above and other objects in view there is provided, in accordance with the invention, a method of operating a telecommunications network, which comprises the following method steps:

providing a switching processor with an operating system and a plurality of application programs for processing application objects containing object data prescribed according to association with an object class;

controlling call-processing equipment with the switching processor at a network node of a telecommunications network;

maintaining the switching processor from at least one control computer, using at least one maintenance message;

forming the maintenance message with a filter condition for selecting particular application objects;

upon execution of an interface program used for a plurality of application programs, utilizing the filter condition to select at least one object class and at least one application program processing the application objects for the object class; and when the selected application program is executed, selecting and processing the application objects.

In the method according to the invention, in addition to the method steps mentioned in the introduction, when an interface program used for a plurality of application programs is executed, the filter condition is used to select at least one object class in a preselection process. This object class is then used to select the application program which processes the application objects in the selected object class. The selection of the object class is thus an intermediate step to determine the application program or programs to be selected. The intermediate step is carried out indirectly when the filter condition is used to select an application program directly.

Thus, in the method according to the invention, the filter condition is used during the actual preselection process, which selects an object class and an associated application program. The application program subsequently likewise uses the filter condition in a final selection process to select the application objects which satisfy the filter condition. An instruction stipulated in the maintenance message is then executed only for the application objects selected in the final selection process. The effect achieved by the preselection process in the interface program is that only a few application programs, or even only one application program, need be executed for the final selection process. With the preselection process, numerous application programs, and hence also the application objects processed by them, are already excluded from the search. The method according to the invention thus prevents unnecessary search procedures.

The use of one interface program used for a plurality of application programs means that the program part need be programmed only once for the preselection process. This also simplifies later changes. The preselection process also has the effect that the interface program does not need to inform all application programs about the maintenance message received. In the preselection process, the amount of possible application objects is estimated high, i.e. the modified filter condition used in the preselection process detects at least the application objects and object classes which are actually possible. On the other hand, in an error-free situation, not all object classes are selected, but rather only an acceptably large amount of object classes. If all the object classes are selected in the preselection process, there is a control error on the part of the control computer. For the estimation, much less data is required than for immediate determination of the application objects concerned by the filter condition. In addition, the preselection process can significantly restrict the amount of possible application objects and application classes, despite the high estimation carried out.

These inventive measures permit the tree structure defined for the application objects to be used in the selection of the application objects themselves. The tree structure can be used to define the filter condition in the actual control computer such that the maintenance message concerns only particular object classes. If the telecommunication network operator wants to access a multiplicity of application objects, then he can do so very manageably by taking into account the tree structure when formulating the filter conditions. On the other hand, the tree structure is also taken into account in the switching processor in that the tree structure is used, by way of example, for an associated application program's processing of the object classes of a particular substructure. The association between the application programs and the substructures also has no effect on the formulation of the filter conditions in the control computer.

In accordance with a development of the method according to the invention, a value is defined in the filter condition for at least one object data item. By way of example, the object data item is defined by an identifier. The preselection process is carried out using the identifier, without taking the value into account. Only during the final selection process is the value defined in the filter condition then used as well. Thus, only object classes are selected during the preselection process. Application objects and their object data are not taken into account in the preselection process. This results in faster preselection.

When the interface program is executed, in another development, a class database is used in which, for each of the object classes, the object data and at least one application program for processing application objects in the respective class are provided. The class database is small as compared with the database containing the application objects. The result of this is that the preselection process can be carried out very quickly in a simple manner.

If, in accordance with another development of the invention, the filter condition contains logic combination operations, such as the AND, the OR or the NOT operation, then the logic structure of the filter condition is evaluated during the preselection process. Preferably, the conjunctive normal form or the disjunctive normal form is used. The use of the normal form permits the preselection process to be carried out more quickly.

The preselection process can be simplified further if NOT operations relating to particular details are replaced by the logic value "TRUE" before the preselection process is carried out. Values stipulated in the filter condition are preferably replaced by a standard value which indicates that the object data item stipulated in the filter condition should be present without its depending on the value itself. The effect achieved by this is that the values of the object data in the application objects need not be known in the interface program in order to carry out the preselection process. The only thing which need be known is which object data appears in which application object. Thus, the interface program need not be informed when the object data in an application object is changed.

The invention also relates to a network element for a telecommunication network which has a program store and at least one processor for executing the method steps of the method according to the invention. Thus, the aforementioned technical effects also apply to the network element according to the invention. Accordingly, with the above and other objects in view there is also provided, in accordance with the invention, a network element for a telecommunication network, in particular for processing the above-outlined method. The element comprises:

a data memory for storing application objects containing object data prescribed according to association with an object class;
 a program memory for storing a plurality of application programs and an interface program;
 wherein the application objects are processed when the application program is executed;
 wherein, upon execution of the interface program, maintenance messages received via an interface to a control computer are forwarded to at least one application program with a filter condition for selecting particular application objects;
 at least one processor configured to execute instructions of the application programs and of the interface program, wherein the processor is programmed to:
  select at least one application program via the filter condition on execution of the interface program; and
  select and process the application objects on execution of the selected application program.

Other features which are considered as characteristic for the invention are set forth in the appended claims.

Although the invention is illustrated and described herein as embodied in a method for operating a telecommunication network using maintenance messages having filter conditions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
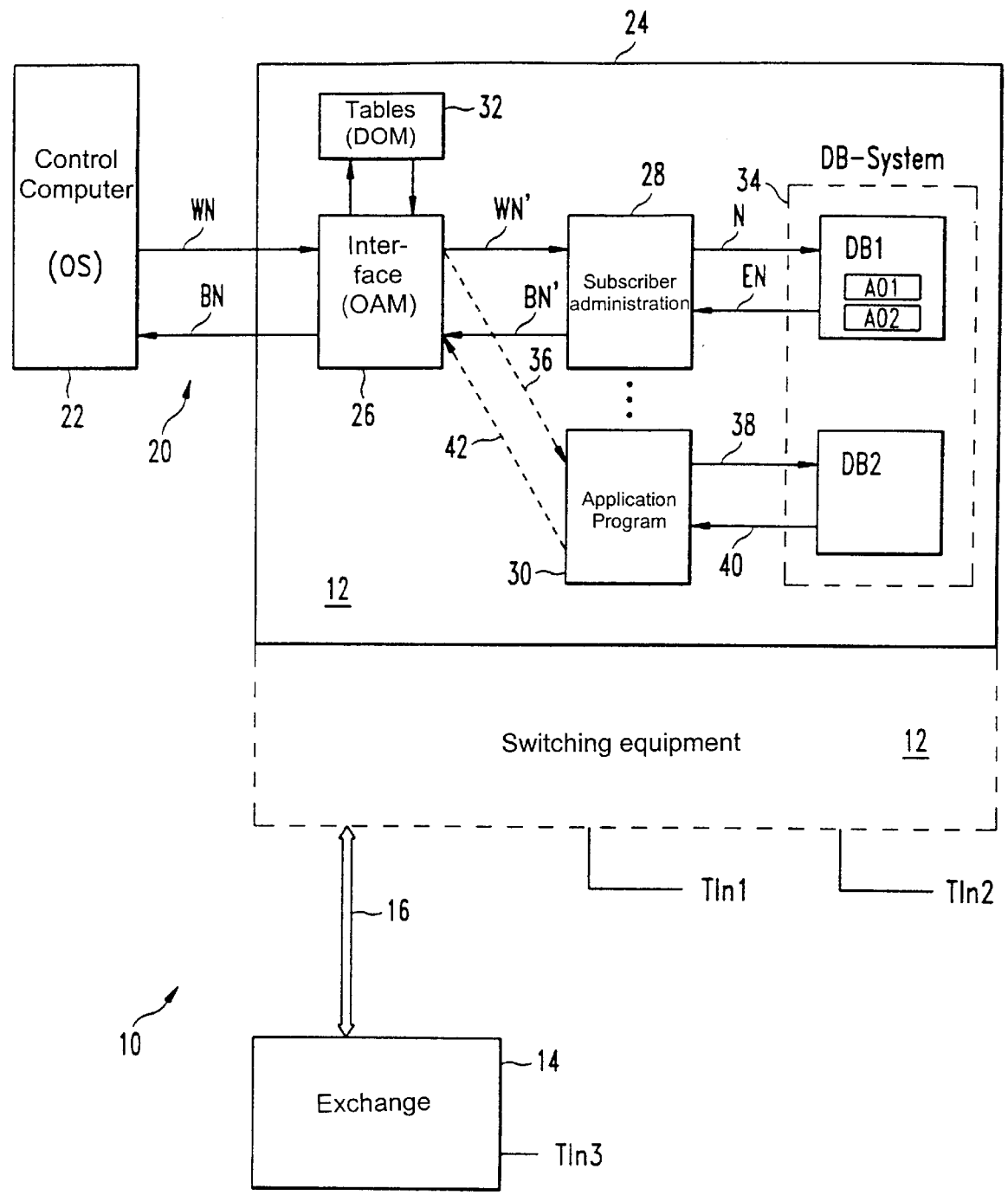
FIG. 1 is a schematic block diagram showing the processing of maintenance messages in a switching processor.

Referring now to the figures of the drawing in detail and first, particularly, to FIG. 1 thereof, there is seen a telecommunication network 10, called TC network 10 for short. The TC network 10 contains a multiplicity of exchanges, of which FIG. 1 shows the exchanges 12 and 14. The TC network 10 also includes connecting lines between the exchanges, of which FIG. 1 shows a connecting line 16 between exchange 12 and exchange 14. The TC network 10 connects the subscribers in the TC network 10, for example the subscribers Tln1 and Tln2 connected to the exchange 12 and the subscriber Tln3 connected to the exchange 14, to one another.

The TC network 10 contains a dedicated telecommunications management network for maintaining the exchanges 12 and 14. A transmission link 20 in the telecommunications management network connects the exchange 12 to a control computer 22. The transmission link 20 transmits maintenance messages WN from the control computer 22 to the exchange 12 in order to change subscriber data for subscriber Tln1 in the exchange 12, for example. For its part, the exchange 12 sends acknowledgement messages BN to the control computer 22 in order to signal correct processing of the maintenance message WN received.

The maintenance messages WN are processed in the exchange 12 by a switching processor 24. The memory of the switching processor 24 stores an interface program 26 which processes the maintenance messages WN when it is executed by a microprocessor. The interface program 26 is the interface between the control computer 22 and a plurality of application programs stored in the switching processor 24. FIG. 1 shows two application programs 28 and 30. The application program 28 is used for administration of the data associated with the subscribers Tln1, Tln2 connected to the exchange 12. These data are stored in application objects AO1 and AO2.

Application program 30 is used for traffic measurement in order to establish the extent to which particular transmission links 16 are used.

The maintenance message WN stipulates a filter condition F1 for the selection of particular application objects AO1, AO2, the filter condition F1 being explained in more detail below with reference to FIG. 2. When the interface program 26 is executed, the filter condition F1 is used to make a preselection, in which application programs 28, 30 suitable for processing the maintenance message WN are determined. Such programs may only be application programs which are able to process application objects AO1, AO2, whose data satisfies the filter condition F1 in the maintenance message WM.

During the preselection process, the interface program 26 accesses a class database 32 which stipulates for each of the object classes the object data and at least one application program 28, 30 for processing application objects in the respective class. The data structures used for the preselection process are explained below with reference to FIG. 3. The method steps executed during the preselection process are explained below with reference to the flowcharts shown in FIGS. 4a and 4b.

In the illustrative embodiment of FIG. 1, the application program 28 is selected when the interface program 26 is executed. The interface program 26 therefore sends the maintenance message WN to the application program 28 as maintenance message WN'. An instruction defined by the maintenance message WN' is executed in the application program 28. In this context, the application program 28 cooperates with a database program 34 which is used to change, erase or read application objects AO1, AO2 in the memory of the switching processor 24. To this end, the application program 28 sends requests N in the form of messages to the database program 34. After the request N has been executed, the database program 34, for its part, sends a result message EN to the application program 28.

The application program 28 determines the application objects AO1, AO2 whose data satisfy the filter condition stipulated in the maintenance message WN'. Only for these application objects is the instruction stipulated in the maintenance message WN' executed, for example a read access operation, a write access operation, or the erasure of an application object.

After the application program 28 has executed the instruction stipulated in the maintenance message WN', it sends an acknowledgement message BN' to the interface program 26 in order to signal that the instruction has been executed correctly or with errors. The interface program 26 forwards the acknowledgement message BN' to the control computer 22 as acknowledgement message BN.

If the application program 30 is selected during the preselection process in the interface program 26, the maintenance message concerned is sent to the application program 30, as indicated with the arrow 36. The application program 30 likewise cooperates with the database program 34, but it accesses different application objects than the application program 28, as indicated with arrows 38 and 40. After a maintenance message has been processed, the application program 30 also sends an acknowledgement message to the interface program 26, as indicated with arrow 42.

Figure 2:
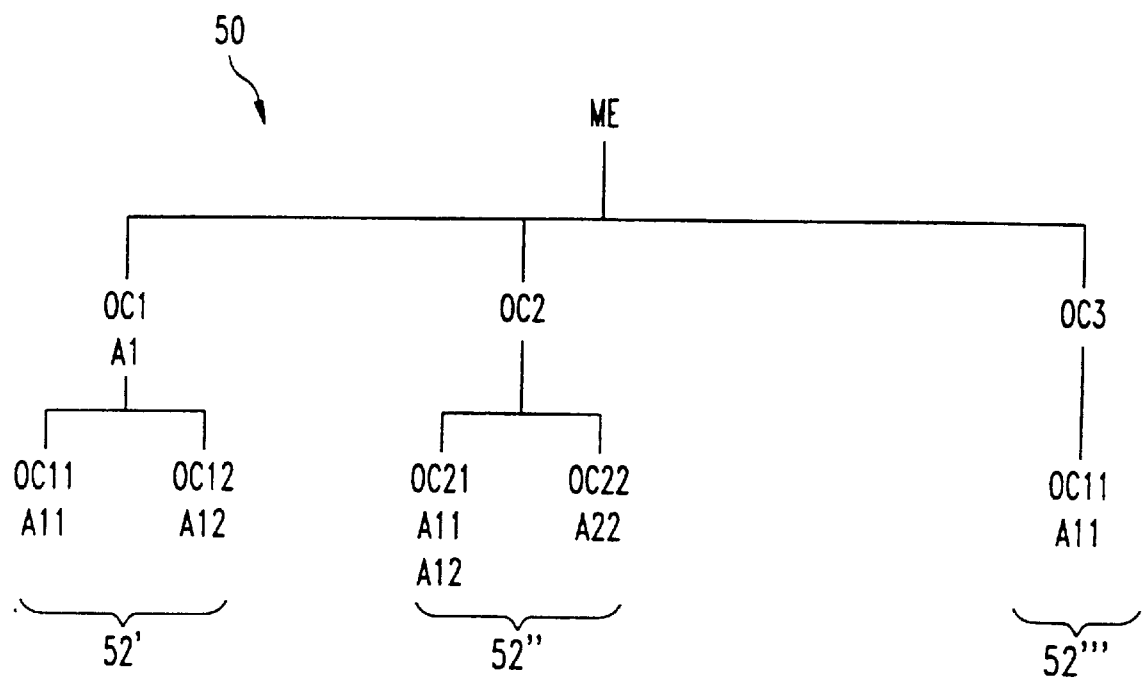
FIG. 2 is a diagrammatic tree structure defining the relationships between application objects.

Referring now to FIG. 2, there is shown a tree structure 50 for defining the relationships between application objects and between object classes OC1 to OC3 and OC11 to OC22. Such tree structures are explained in ITU-T standard X.720 (01/92) "Data Communication Networks—Information Technology—Open Systems Interconnection—Structure of Management Information: Management Information Model" in section 6. An object class ME forms the point of origin of the tree structure 50. In any call-processing equipment, the object class ME covers just one application object, which contains general data about the respective call-processing equipment. A first level of the tree structure So contains the object classes OC1 to OC3. When creating application objects in object classes OC1 to OC3, the application object in object class ME needs to be stipulated. For this reason, it is usual to refer to the fact that the application objects in object classes OC1 to OC3 are contained in object class ME as so-called subordinate application objects.

A second level of the tree structure 50 contains the object classes OC11 to OC22. A first substructure 52' is formed by the object classes OC1, OC11 and OC12, since an application object in the superordinate object class OC1 needs to be stipulated when creating application objects in the object classes OC11 and OC12. A substructure 52" contains object classes OC21 and OC22, which have the object class OC2 as superordinate class. A third substructure 52''' contains, in turn, the object class OC11, but with the object class OC3 being the superordinate class. When an application object in the substructure 52''' is created, an application object in the superordinate class OC3 needs to be stipulated.

FIG. 2 also shows identifiers for selected object data defined for the object classes OC1 to OC3 and OC11 to OC22. The object class OC1 contains an object data item A1. The object class OC11 contains an object data item A11, and the object class OC12 contains an object data item A12. The object class OC21, like the object class OC11 already, contains the object data item A11 and also the object data item A12. The object class OC22 contains an object data item A22.

The tree structure 50 is also known in the control computer 22, illustrated in FIG. 1. The operator of the TC network 10 uses the tree structure 50, when maintaining the TC network 10, to select particular application objects in the exchanges 12, 14. The maintenance message WN, cf. FIG. 1, stipulates the following filter condition F1:

$F1=AND\{OC=OC12, A12=W1\}$, where AND is the logic AND operation, OC is an identifier for the object class and W1 is a value for the object data item A12. In the filter condition F1, the operator stipulates that he would like to access only application objects in which the object data item A12 has the value W1.

The switching processor 24 in the exchange 12 likewise takes the tree structure 50 into account during the preselection process. The tree structure 50 is recorded implicitly in the class database 32. In addition, a preselection process is carried out correctly only if the filter condition F1 concerns only application objects in a substructure 52', 52" or 52'''. This is explained in more detail below with reference to FIGS. 4a and 4b.

Figure 3:
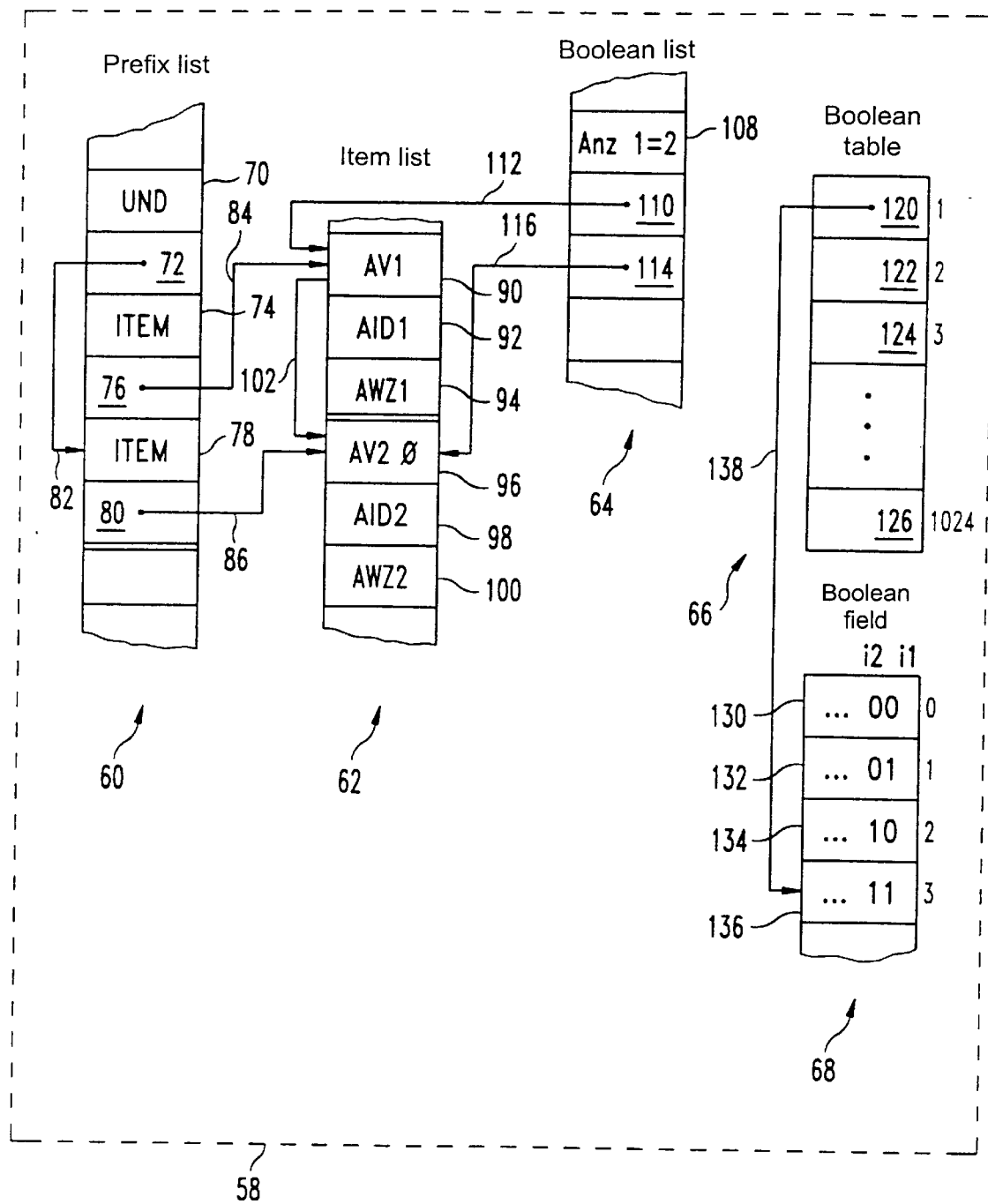
FIG. 3 is a schematic showing data structures used in a preselection process to evaluate a filter condition contained in the maintenance message.

FIG. 3 shows, in a memory 58 in the switching processor 24, a prefix list 60, an item list 62, a Boolean list 64, a Boolean table 66 and a Boolean field 68, which are used to evaluate the filter condition F1 during the preselection process. The structure of the filter F1 is recorded in the prefix list 60.

The prefix list 60 contains data fields 70 to 80 to describe the filter F1. The data field 70 stores the operand AND in encrypted form. A subsequent address reference in the data field 72 points to the last item detected by the AND operation, i.e. to the item i2, cf. arrow 82. The fact that an item now follows in the filter F1 is recorded in the data field 74. An address reference in the subsequent data field 76, cf. arrow 84, refers to the item i1 in the item list 62. The reference to an item is in turn recorded in the data field 78. An address reference in the subsequent data field 80 refers to the associated item i2 in the item list 62, cf. arrow 86.

In the item list 62, three data fields 90 to 94 are associated with the item i1, and three data fields 96 to 100 are associated with the item i2. The data field 90 stores an address reference AV1, represented by an arrow 102, to the second element in the item list 62 for the item i2. The data field 92 stores an attribute identification AID, which distinguishes which object data item is concerned by the first item i1. In the illustrative embodiment, this is the object class OC.

The data field 94 stipulates the value AWZ1 of the attribute in item i1, i.e. in the illustrative embodiment a value for the object class OC12. The data field 96 stores an address reference AV2 containing a so-called zero pointer to mark the end of the item list 62. The zero pointer is represented by the address zero, for example.

The data field 98 contains an attribute identification AID2, which stipulates the object data item to which the item i2 refers. In the illustrative embodiment, this is the object data item A12. The data field 100 stores the value which the object data item A12 is meant to have on the basis of the filter F1. In the illustrative embodiment, this is the value W1.

The section of the Boolean list 64 shown in FIG. 3 likewise relates to the filter F1. The number of items i1, i2 in the filter condition F1 is recorded in a data field 108, i.e. the value two. An address reference to the first item i1 in the item list 62 is recorded in a subsequent data field 110 in the Boolean list 64, cf. arrow 112. A data field 114 in the Boolean list 64 stores an address reference to the item i2 in the item list 62, cf. arrow 116 also.

The first data field 90 of the first item i1 in the item list 62 can be accessed both from the prefix list 60 via the address reference in the data field 76 and from the Boolean list 64 via the address reference in the data field 110 Accordingly, the item i2 in the item list 62 can be accessed from the prefix list 60 via the address reference in the data field 80 and from the Boolean list 64 via the address reference in the data field 114.

When an evaluation program is executed, all combinations of logic values for the items i1, i2 of the filter F1 are checked to determine whether the filter condition F1 is satisfied. If the filter condition is satisfied for a combination, then a reference to the respective combination is stored in a data field 120 in the Boolean table. For the filter condition F1, the filter condition is satisfied only when both items i1 and i2 have the logic value "TRUE". Therefore, the Boolean table 66 contains only the address reference in the data field 120. Further address references can be stored in further data fields 122 to 126 in the Boolean table 66.

In the Boolean field 68, the combinations for the items i1 and i2 are recorded in four data fields 130 to 136. As already mentioned, the filter condition F1 is satisfied only when both the item i1 and the item i2 have the logic value "TRUE". For the filter condition F1, only the address reference in the data field 120 in the Boolean table 66 gives a reference, therefore, namely the address reference to the combination "11" in the data field 136 in the Boolean field 68, cf. arrow 138. The combination "11" means that both items i1 and i2 have the logic value "TRUE". The address references in the Boolean table 66 ultimately describe the disjunctive normal form DNF of the filter condition F1.

Figure 4A:
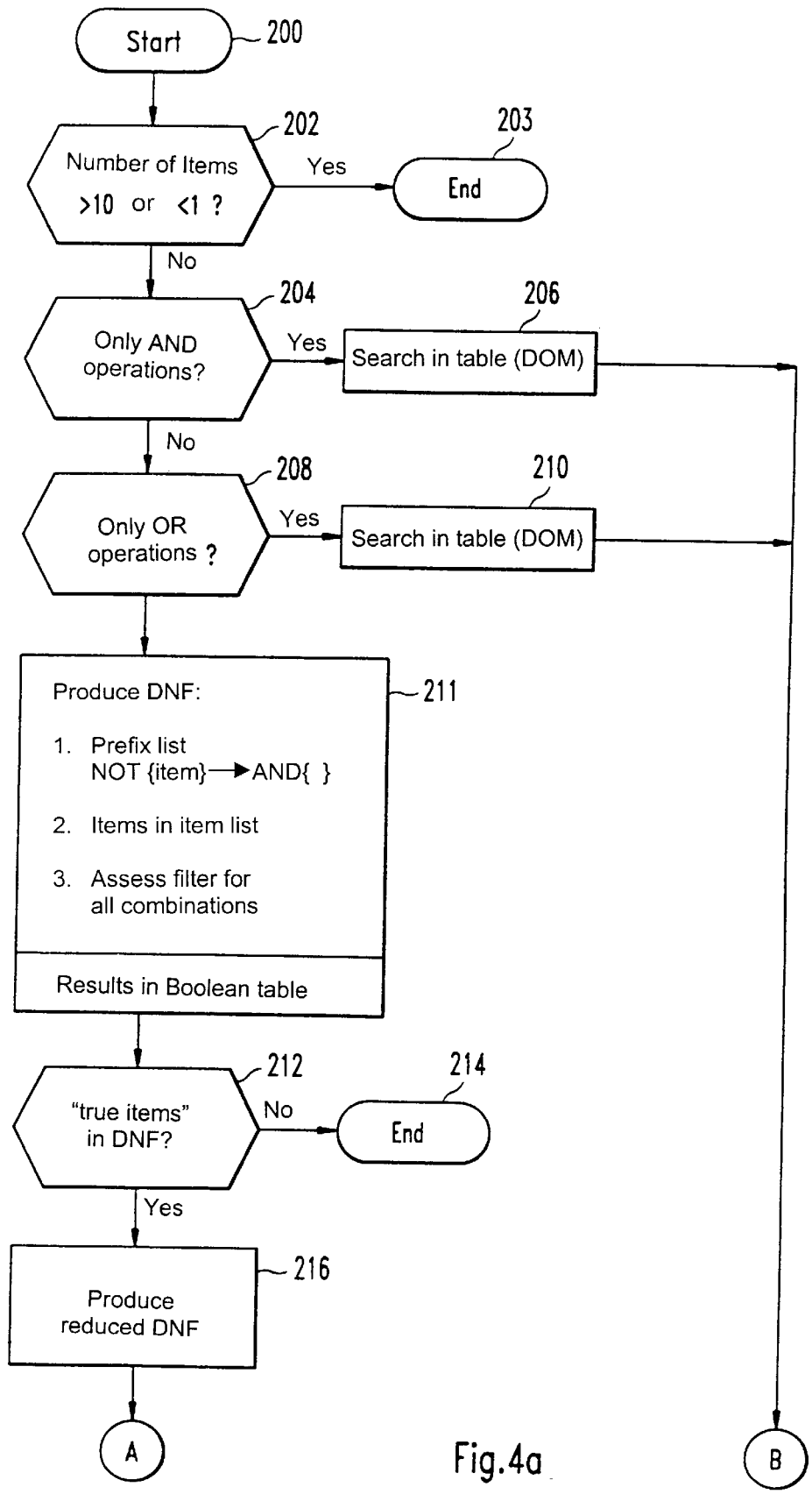
FIGS. 4a and 4b show a flowchart outlining the method steps carried out during the preselection process.
Figure 4B:
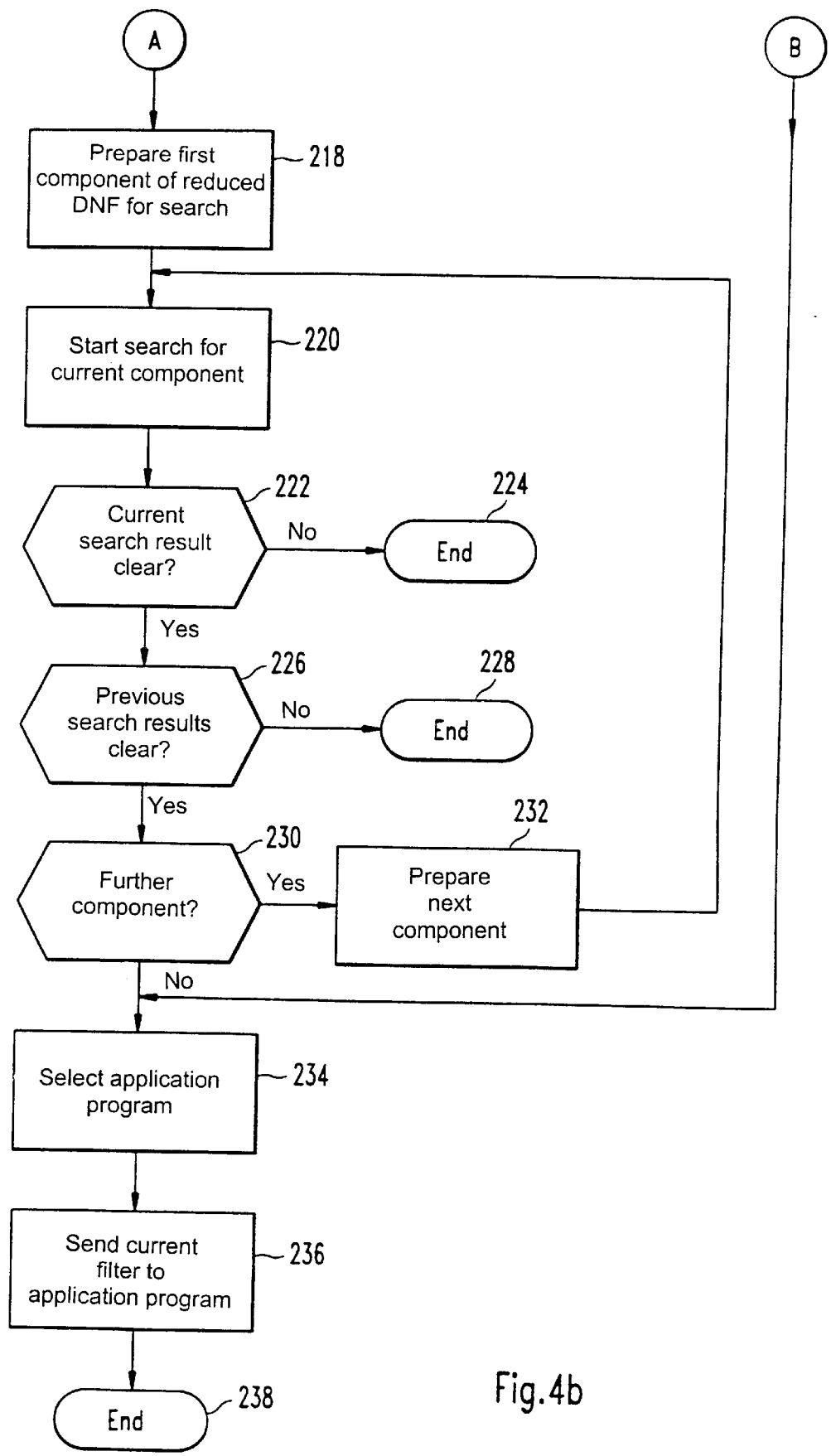

FIGS. 4a and 4b show a flowchart outlining the method steps that are executed during the preselection process. The data structures explained with reference to FIG. 3 are thereby used, so that reference is also made to FIG. 3 for the explanation of FIG. 4. The method starts in a step 200. In the subsequent step 202, a check is carried out to determine whether the number of items in the filter condition F1 is greater than 10 or less than 1. If the number of items is outside of this range, then the method is ended in a step 203, since more than 10 filter items can be evaluated only with a disproportionately high level of computation complexity. With a number of items of fewer than 1, there must obviously be an error. If the number of items in the filter condition to be processed is between one and ten items, then step 202 is followed directly by a step 204.

In method step 204, a check is carried out to determine whether only AND operations appear in the filter condition.

If this is the case, a simplified search in the class database 32 shown in FIG. 1 is carried out, cf. method step 206. If, on the other hand, method step 204 establishes that the filter condition does not contain only AND operations, then step 204 is followed directly by a method step 208.

In method step 208, a check is carried out to determine whether the filter condition to be processed contains only OR operations. If this is the case, a simplified search in the class database 32, cf. FIG. 1, takes place in a method step 210. If, on the other hand, step 208 establishes that the filter condition contains not only OR operations, then the disjunctive normal form DNF is produced, cf. method step 211.

In method step 211, all NOT operations are first replaced by the value "TRUE" in the prefix list 60. This is done by setting the operand AND{}, which always produces the logic value "TRUE", instead of the operand NOT{Item} in each case. Subsequently, the items are entered in the item list 62 and in the Boolean list 64. In a last part of method step 210, the filter to be processed is assessed for all combinations of the items. The combinations for which the filter condition is satisfied are entered in the Boolean table 66.

After method step 210, a check is carried out in a method step 212 to determine whether there are combinations for which the filter condition is satisfied. If there are no entries in the Boolean table, the method is ended in step 214, because the filter condition obviously cannot be satisfied by any application object. If method step 212 establishes that there are entries in the Boolean table 66, then a method step 216 follows directly.

In method step 216, a so-called reduced disjunctive normal form is produced from the disjunctive normal form stipulated by the entries in the Boolean table 66 by mathematically factoring out items, said reduced disjunctive normal form usually containing fewer combinations than the disjunctive normal form DNF. The number of entries in the Boolean table is consequently usually reduced in method step 216.

In a subsequent method step 218, the first combination of the reduced disjunctive normal form DNF is prepared for the search in the class database 32. To this end, the relative combination "11" is read from the Boolean field 68. In the combination "11", particular items are allocated to the bit places according to their position. The right-hand bit place is associated with item i1, and the bit place situated on the left next to the latter is associated with item i2. At both bit places, there is a one in the combination "11". For that reason, both items i1 and i2 are taken into account in the current search procedure. The attribute identification AID1 is used to recognize that an object class OC is stipulated in item i1. Accordingly, the object class OC12 is determined using the value AWZ1. The attribute identification AID2 is used to recognize that item i2 relates to an object data item, namely the object data item A12. The object data item A12 is used in the search. In method step 218, the value AWZ2 is not taken into account. Instead of the value AWZ2, an operand "PRESENT" is used. This means that the filter condition F1 can be evaluated by the interface program 26, cf. FIG. 1, without the value AWZ2 needing to be checked using the object data for the application objects. By contrast, therefore, the value AWZ1 is used in method step 218 because the object classes are recorded in the class database 32.

In a method step 220, the search in the class database 32 is carried out using the attribute identification and using the combination read from the Boolean field 68. In this context, the object class OC12 sought is that which contains the object data item stipulated by the attribute identification AID2.

The object class OC12 is found. For the exemplary embodiment, the filter condition F1 has been chosen in a simple form. Usually, filter conditions having more than two items are used, in which case the search result is not as manageable as in the case of the filter condition F1.

In the subsequent method step 222, a check is carried out to determine whether the object classes found in method step 220 are contained in a common substructure 52', 52" or 52'" of the tree structure 50, cf. FIG. 2 also. If the object classes for a plurality of substructures 52', 52" and 52'" satisfy the filter condition which is to be processed, then method step 222 is followed by a method step 224, in which the method is terminated. An error message is sent to the control computer 22 with the information that the filter condition is too complex. If, on the other hand, method step 222 establishes that no object classes have been found or that object classes found in method step 220 are contained in a substructure 52', 52" or 52'", then method step 222 is followed directly by a method step 226.

In method step 226, all the search steps carried out to date in method step 220 for the filter condition which is to be processed are taken into account to check whether the application objects found are contained in a common substructure 52', 52" or 52'" of the tree structure 50. If this is not the case, then method step 226 is followed by a method step 228, in which the method is terminated. In this case, a message is again sent to the control computer 22 with the information that the filter condition is too complex. If, on the other hand, method step 226 establishes that the application objects found to date are contained in a substructure 52', 52" or 52'", then method step 226 is followed directly by a method step 230.

In method step 230, a check is carried out to determine whether there are still further entries in the Boolean table 66, i.e. whether the reduced disjunctive normal form DNF contains still further combinations. If this is the case, then A method step 230 is followed by a method step 232, in which the next combination is prepared for the search. During this, the combination concerned is read from the Boolean field 68. In addition, the attribute identifications AID from the item list 62 are again used. The method is subsequently continued in method step 220.

The method is now in a loop comprising the method steps 220 to 232. If no error messages arise in method steps 224 and 228, the loop is ended in method step 230 only after all the combinations of the reduced disjunctive normal form DNF have been processed. In this case, method step 230 is followed directly by a method step 234.

Method step 234 determines which substructure 52', 52" or 52'" of the tree structure 50 contains the application objects found. A respective application program is provided for each substructure 52', 52" and 52'". In method step 234, that application program is selected which is associated with the substructure 52', 52" or 52'" in which the application objects have been found. Method step 234 is also carried out directly after method step 206 or 210 if the filter condition contains only AND operations or only OR operations.

Method step 234 is followed directly by a method step 236, in which the processed filter condition is sent to the application program selected in method step 234. The selected application program then likewise uses the filter condition to select individual application objects and processes this application object in accordance with the instruction prescribed in the maintenance message. The method is ended in a method step 238.

In a further illustrative embodiment, the maintenance message WN contains a filter condition:

F2=AND{OC=OC12, NOT{A12=W1}}, where the items and operations used are essentially equivalent to those in the filter condition F1. The NOT operation is a logic NOT, i.e. application objects are sought which specifically do not contain the argument for the NOT operations. That means that application objects in the application class OC12 are sought whose object data item A12 does not have the value W1. When the filter condition F2 is processed, the NOT operation is replaced by the operation AND{} in method step 210. This measure ensures that the search detects all possible application objects even though reference is not made to the exact value W1, but rather only the presence of the associated object data item A12 is taken into account.

In another illustrative embodiment, the maintenance message WN contains a filter condition:

F3=AND{A11=W1, A12=W2}.

According to FIG. 2, the object class OC21 is determined for the filter condition F3 in the preselection. In the final selection, the application objects in the object class OC21 are selected for which the object data item A11 has the value W1 and the object data item A12 has a value W2.

We claim:

1. A method of operating a telecommunications network, which comprises:
   providing a switching processor with an operating system and a plurality of application programs for processing application objects containing object data prescribed according to association with an object class;
   controlling call-processing equipment with the switching processor at a network node of a telecommunications network;
   maintaining the switching processor from at least one control computer, using at least one maintenance message;
   forming the maintenance message with a filter condition for selecting particular application objects;
   upon execution of an interface program used for a plurality of application programs, utilizing the filter condition to select at least one object class and at least one application program processing the application objects for the object class; and
   when the selected application program is executed, selecting and processing the application objects.

2. The method according to claim 1, wherein the filter condition defines a value for at least one object data item, and the method further comprises:
   selecting the application program based on at least one of the object data item stipulated in the filter condition and an object class stipulated in the filter condition;
   selecting, with the selected application program, the application objects for which the object data item stipulated in the filter condition has the value stipulated in the filter condition.

3. The method according to claim 1, which comprises, when the interface program is executed, using a class database stipulating, for each of the object classes, the object data and at least one application program for processing application objects in the respective class.

4. The method according to claim 1, which comprises defining the filter condition with at least one logic combination operation, and evaluating a logic structure of the filter condition when the interface program is executed.

5. The method according to claim 4, wherein the evaluating step comprises forming at least one of a normal form and a reduced normal form.

6. The method according to claim 4, wherein the at least one logic combination operation is selected from the group consisting of AND, OR, and NOT operation.

7. The method according to claim 4, wherein the evaluating step comprises replacing all NOT operations relating to particular details by a logic value "TRUE."

8. The method according to claim 4, wherein the evaluating step comprises replacing the value in the filter condition by a prescribed standard value indicating that the object data item stipulated in the filter condition needs to be present in the object class to be determined.

9. The method according to claim 1, which comprises defining a tree structure for the classes and using the tree structure by the control computer and by the switching processor.

10. The method according to claim 1, which comprises performing, with the interface program, further interface functions between the control computer and the switching processor.

11. The method according to claim 10, wherein the performing step comprises performing a protocol conversion between the message protocol inside and outside of the switching processor.

12. The method according to claim 1, which comprises selecting at least one program from the group consisting of:
   a first application program for subscriber administration;
   a second application program for an administration of connecting lines to other switching equipment;
   a third application program for maintaining the switching equipment; and
   a fourth application program for traffic measurement on connected links.

13. The method according to claim 1, which comprises carrying out, with the application objects, processes for processing the object data defined by a respective object class.

14. A network element for a telecommunication network, comprising:
   a data memory for storing application objects containing object data prescribed according to association with an object class;
   a program memory for storing a plurality of application programs and an interface program;
   wherein the application objects are processed when the application program is executed;
   wherein, upon execution of the interface program, maintenance messages received via an interface to a control computer are forwarded to at least one application program with a filter condition for selecting particular application objects;
   at least one processor configured to execute instructions of the application programs and of the interface program, wherein said processor is programmed to:
      select at least one application program via the filter condition on execution of the interface program; and
      select and process the application objects on execution of the selected application program.

15. The network element according to claim 14, wherein said processor is programmed to carry out the method according to claim 1.

* * * * *